US012808629B2

(12) United States Patent
Queiroz De Aguiar

(10) Patent No.: US 12,808,629 B2
(45) Date of Patent: Nov. 24, 2026

(54) MUNITION LAUNCHER FOR AIRCRAFT AND AMMUNITION TRAY FOR A MUNITION LAUNCHER

(71) Applicant: Condor S.A. Indústria Química, Nova Iguaçú-RJ (BR)

(72) Inventor: Carlos Frederico Queiroz De Aguiar, Nova Iguaçú-RJ (BR)

(73) Assignee: CONDOR S.A. INDÚSTRIA QUÍMICA, Adrianópolis— Nova Iguaçú/RJ (BR)

( * ) Notice: Subject to any disclaimer, the term of this patent is extended or adjusted under 35 U.S.C. 154(b) by 245 days.

(21) Appl. No.: 18/405,017

(22) Filed: Jan. 5, 2024

(65) Prior Publication Data

US 2024/0239526 A1 Jul. 18, 2024

(30) Foreign Application Priority Data

Jan. 6, 2023 (BR) ...................... 10 2023 000340 0

(51) Int. Cl.

*B64D 1/04* (2006.01)
*B64U 101/18* (2023.01)
*F41A 9/82* (2006.01)
*F41F 5/00* (2006.01)
*B64D 1/02* (2006.01)

(52) U.S. Cl.

CPC .................. *F41F 5/00* (2013.01); *B64D 1/04* (2013.01); *F41A 9/82* (2013.01); *B64D 1/02* (2013.01); *B64U 2101/18* (2023.01)

(58) Field of Classification Search

CPC ..... B64U 20/40; B64U 60/30; B64U 2101/18
See application file for complete search history.

(56) References Cited

U.S. PATENT DOCUMENTS

| | | | | | |
|---|---|---|---|---|---|
| 1,368,322 | A * | 2/1921 | Clarke | B64D 1/04 89/1.51 |
| 2,368,671 | A * | 2/1945 | Lombard | B64D 1/02 294/82.34 |
| 5,259,289 | A * | 11/1993 | Peries | F41F 7/00 102/505 |
| 11,396,375 | B2 * | 7/2022 | Teetzel | B64U 50/39 |
| 2017/0082397 | A1 * | 3/2017 | Hester, Jr. | F41G 7/2293 |
| 2018/0072415 | A1 * | 3/2018 | Cantrell | B64D 1/10 |
| 2018/0362157 | A1 * | 12/2018 | Teetzel | B64U 30/294 |
| 2019/0277603 | A1 * | 9/2019 | Livingstone | B64D 1/06 |

(Continued)

FOREIGN PATENT DOCUMENTS

| | | | | |
|---|---|---|---|---|
| CN | 109131889 A * | 1/2019 | B64D 1/04 |
| CN | 210284655 U * | 4/2020 | |

(Continued)

*Primary Examiner* — Gabriel J. Klein
(74) *Attorney, Agent, or Firm* — Sheridan Ross P.C.

(57) ABSTRACT

This Invention refers to a munition launcher for aircraft that comprises a chassis, which may be attached to an aircraft and with embedded smart electronics, a coupling mechanism attached to the chassis, and at least one ammunition tray coupled in a removable manner to the coupling mechanism. The ammunition tray comprises a plurality of munition openings configured to receive munitions, and at least one latch pin that attaches the tray to a munition launcher chassis. According to this invention, the ammunition tray may be detached from the chassis by releasing at least one latch pin.

8 Claims, 7 Drawing Sheets

(56) References Cited

U.S. PATENT DOCUMENTS

| | | | | |
|---|---|---|---|---|
| 2023/0008140 | A1 * | 1/2023 | Raji | F42C 15/42 |
| 2025/0058873 | A1 * | 2/2025 | Tan | B64D 1/06 |
| 2026/0008537 | A1 * | 1/2026 | Ball | B64C 17/08 |

FOREIGN PATENT DOCUMENTS

| | | | | | |
|---|---|---|---|---|---|
| CN | 111141174 | A | * | 5/2020 | B64D 1/04 |
| CN | 214729682 | U | * | 11/2021 | |
| CN | 116750192 | A | * | 9/2023 | B64D 1/06 |
| CN | 116873206 | A | * | 10/2023 | B64D 7/00 |
| CN | 117799876 | A | * | 4/2024 | B64D 1/02 |
| CN | 118000181 | A | * | 5/2024 | B64D 1/18 |
| CN | 118683737 | A | * | 9/2024 | B64U 10/13 |
| CN | 118723074 | A | * | 10/2024 | B64U 10/13 |
| CN | 114537669 | B | * | 1/2025 | B64D 1/04 |
| DE | 102024103975 | A1 | * | 8/2025 | B64D 1/02 |
| EP | 3298342 | B1 | * | 7/2019 | F41F 3/065 |
| KR | 101716044 | B1 | * | 3/2017 | F42B 33/00 |
| KR | 20180130652 | A | * | 12/2018 | A62C 3/025 |
| KR | 20190093070 | A | * | 8/2019 | B64D 1/06 |
| KR | 102140396 | B1 | * | 7/2020 | B63C 9/01 |
| KR | 20220155854 | A | * | 11/2022 | B64D 1/02 |
| KR | 102731291 | B1 | * | 11/2024 | B64U 50/30 |
| WO | WO-2024112916 | A1 | * | 5/2024 | B64D 1/06 |
| WO | WO-2024191323 | A1 | * | 9/2024 | F42B 5/05 |

* cited by examiner

MUNITION LAUNCHER FOR AIRCRAFT AND AMMUNITION TRAY FOR A MUNITION LAUNCHER

CROSS REFERENCE TO RELATED APPLICATIONS

This application claims the benefit of Brazilian Patent Application No. BR102023000340-0 filed Jan. 6, 2023, the contents of which are incorporated herein by reference in its entirety.

TECHNICAL FIELD

This Invention refers to a munition launcher for aircraft, especially for drones. Moreover, this invention also relates to an ammunition tray that may be coupled to said munition launcher.

BACKGROUND TO THE INVENTION

Within the context of activities intended to maintain order, non-lethal weapons are used to control large groups of people by temporarily disabling them. For this purpose, non-lethal projectiles with stunning and/or incapacitating effects are commonly used in operations conducted to control disturbances, such as by using light flashes, smoke, loud bangs, tear gas, impact, and pepper spray, among others. These projectiles are generally fired by launchers, or manually in the form of a cartridge or a grenade.

Confrontations between law enforcement forces and conflict groups are dangerous for both parties. On one hand, riot squads need to be relatively close to disturbances, so that projectiles have the desired effect. On the other hand, launches lack accuracy, placing protesters at a greater risk than necessary.

Consequently, using drone-type aircraft to launch non-lethal munitions is a major public safety innovation that has gained ground over the past few years. The accuracy, range, and maneuvering capacity of drones provide efficient shot-firing capabilities that can control situations remotely, thus avoiding riot police coming into direct conflict with such situations.

The context where this type of equipment operates is usually volatile, and there may be a need for action at any moment. However, currently known launch platforms used on aircraft employ methods that do not favor the reloading operation of ammunition. Large ammunition magazines or even entire launchers, in some cases, must be removed from the drone to allow for the loading of ammunition for a new operation. These developed systems require more time and render the entire firing system inoperative during such procedures.

Advantages Over the Prior Art

The main purpose of this invention is to provide a munition launch system for aircraft, with a simple structure that can be reloaded quickly with ammunition, where the reloading process can begin with the aircraft still in flight, thus minimizing system reloading times and ensuring speed, ease, and safety when in operation.

Another purpose of the invention is to provide a flexible system that can handle different tray configurations for use with assorted munition calibers.

A third purpose of the invention is to provide a safer launch system fitted with redundant safety mechanisms, thus ensuring that even if one of the mechanisms comes loose while in flight, the ammunition will remain securely attached to the launcher.

SUMMARY OF THE INVENTION

This Invention is intended to provide a solution to issues found at the state of the art through a munition launcher for aircraft comprised of a chassis that may be attached to the aircraft, with embedded smart electronics, a coupling mechanism attached to the chassis, and at least one ammunition tray is coupled in a removable manner to the coupling mechanism. The munition launcher of the invention is configured in a manner whereby the ammunition tray is preferably fitted with latch pins and a bolt receiver. Furthermore, the coupling mechanism preferably consists of two fitting structures that comprise openings whose shapes are compatible with the tray latch pins and also comprise a bolt groove. According to the invention, the fitting structures are attached to the chassis in a movable manner by springs and bearings. Furthermore, in an unbolted position, the ammunition tray may be coupled to the fitting structures by inserting the tray latch pins into the fitting openings on the fitting structures. The launcher of the present invention may further comprise a bolt configured to run through the bolt groove and lock the tray onto the chassis, with the activation of the said bolt mechanism returning the fitting structure to the unbolted position.

This Invention also relates to an ammunition tray for a munition launcher that comprises a plurality of munition openings shaped to hold the munitions, and at least one latch pin attaching the tray to a munition launcher chassis. The tray of the present invention may be detached from the chassis by releasing at least one latch pin. Preferably, the ammunition tray comprises a plurality of latch pins having a configuration with a wider top than the width of the body. Furthermore, the ammunition tray may also comprise handles and/or a bolt receiver.

BRIEF DESCRIPTION OF THE DRAWINGS

The present invention is described below in greater detail through an example of its embodiment, as shown in the drawings. The Figures illustrate.

DETAILED DESCRIPTION OF THE INVENTION

The munition launcher for aircraft of the present invention comprises at least one chassis that may be attached to an aircraft and with embedded smart electronics, at least one coupling mechanism attached to the chassis and configured for coupling an ammunition tray, at least one removable ammunition tray, and a bolt that holds the tray in the bolted position on the coupling mechanism. The launcher is preferably made from high-resistance polymer material.

Figure 1:
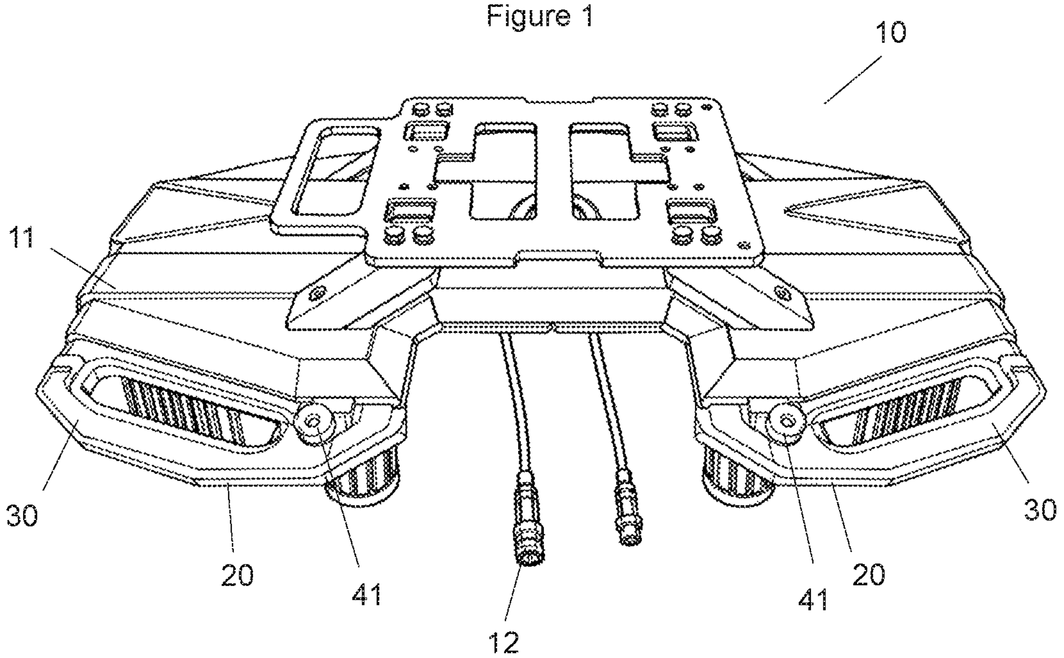
FIG. 1—Top front view of a preferred embodiment of the munition launcher system of the present invention in the armed state.

FIG. 1 Illustrates an example of a preferred embodiment of the invention in the armed state. On munition launcher 10 of the present invention, the chassis 11 has attachment mechanisms for attaching the launcher to an aircraft and embedding all the smart electronics needed to control its operations and launcher shots. A coupling mechanism is attached to the chassis 11 for coupling a removable ammunition tray 20.

According to a preferred embodiment of the invention, the coupling mechanism is comprised of two fitting structures 30 that comprise slots for holding the ammunition tray 20. The tray is bolted into the fitting structure 30 by a bolt 41.

In a preferred embodiment of the invention, two ammunition trays can be coupled to the munition launcher 10 as shown in FIG. 1.

The munition launcher 10 of the present invention optionally comprises power and data feed connectors 12, provided to form the interface between the munition launcher 10 and the aircraft. Through these connectors, the launch platform can be powered by electricity and exchange information with the aircraft.

Figure 2:
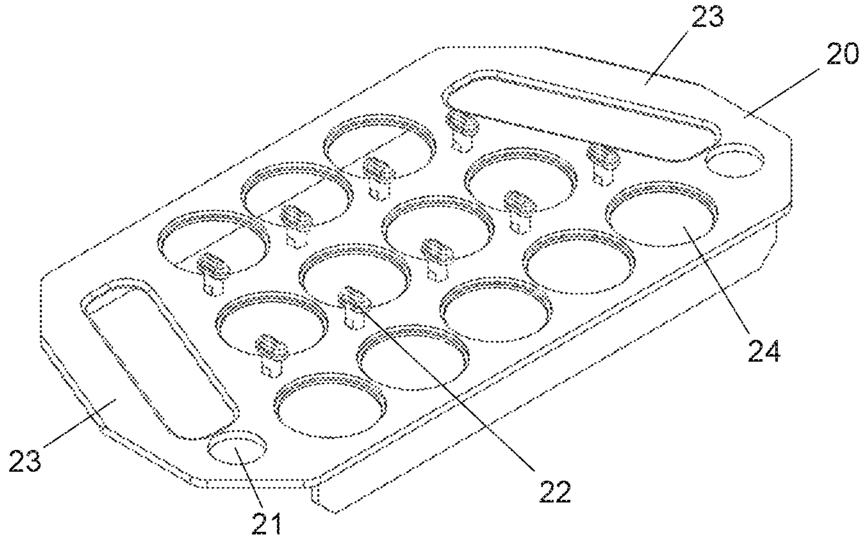
FIG. 2—Top perspective view of an embodiment of the ammunition tray.

FIG. 2 illustrates a preferred embodiment of a configuration for the tray 20. The tray 20 of the present invention comprises a plurality of munition openings 24 wherein the munitions are placed. The tray 20 is also provided with at least one latch pin 22 that allows the tray 20 to be coupled to the chassis 11 of the munition launcher 10. The tray 20 also comprises a bolt receiver 21, configured to receive a bolt 41. Preferably, the at least one latch pin 22 on the tray 20 consists of a plurality of latch pins 22 arrayed along the length of the tray in order to support it during aircraft operations.

Optionally, the ammunition tray 20 is provided with handles 23 that allow easier handling of the tray 20 during the coupling, uncoupling, and handling operations of the tray 20.

The embodiment illustrated in FIG. 2 shows twelve munition openings 24. However, different configurations, dimensions and quantities of munition openings 24 and latch pins 22 may be used to hold different types of munitions, without departing from the scope of the invention. For example, the number of latch pins 22 may depend on factors such as the weight and size of the tray 20.

Figure 3:
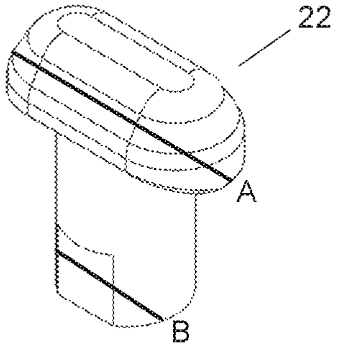
FIG. 3—Top perspective view of the bolt illustrated in the ammunition tray shown in FIG. 2.

FIG. 3 presents an expanded view of an embodiment of a latch pin 22 as shown in FIG. 2. In this exemplificatory embodiment, the latch pin 22 has a larger top measurement A than its body measurement B.

Figure 4:
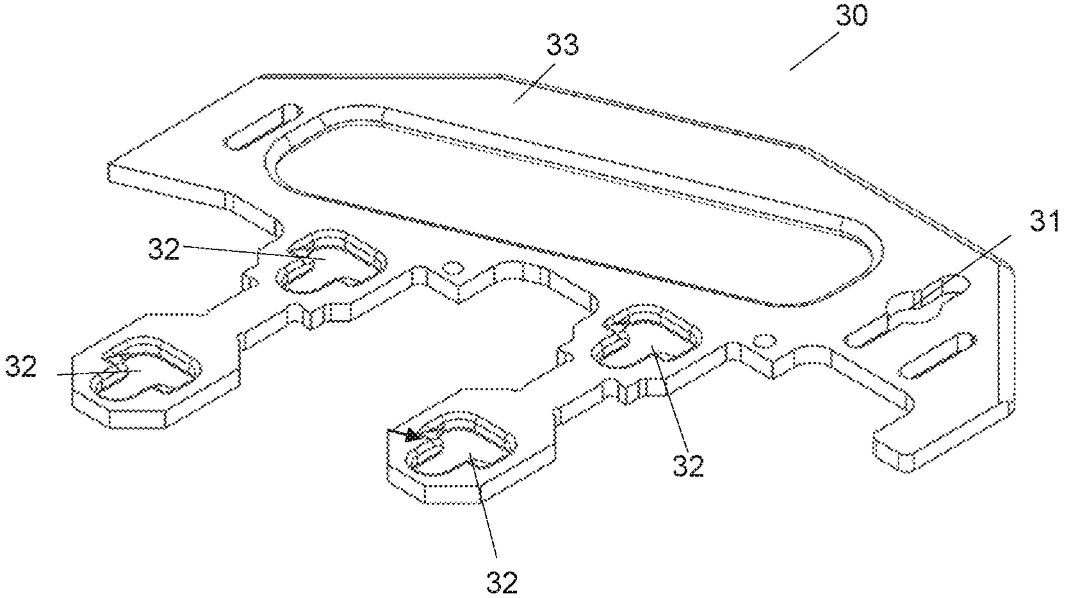
FIG. 4—Top perspective view of an embodiment of a fitting structure.

FIG. 4 shows a preferred configuration of the fitting structure 30 that is compatible with the embodiment illustrated in FIGS. 2 and 3. The fitting structure 30 comprises fitting openings 32 that are compatible with the latch pins 22, whereby the configuration of the fitting opening 32 is wider at one end, compatible with the top of the latch pin 22 on the tray 20 and is narrower at the other end, compatible with the body of the latch pin 22.

The fitting structure 30 preferably comprises a handle 33 compatible with the handle 23 on the tray 20. Furthermore, the fitting structure 30 also comprises a bolt groove 31 configured to allow the movement of the bolt 41 from the bolted position wherein the tray 20 remains coupled on the chassis 11, to the unbolted position wherein the tray 20 is uncoupled from the chassis 11.

Figure 5:
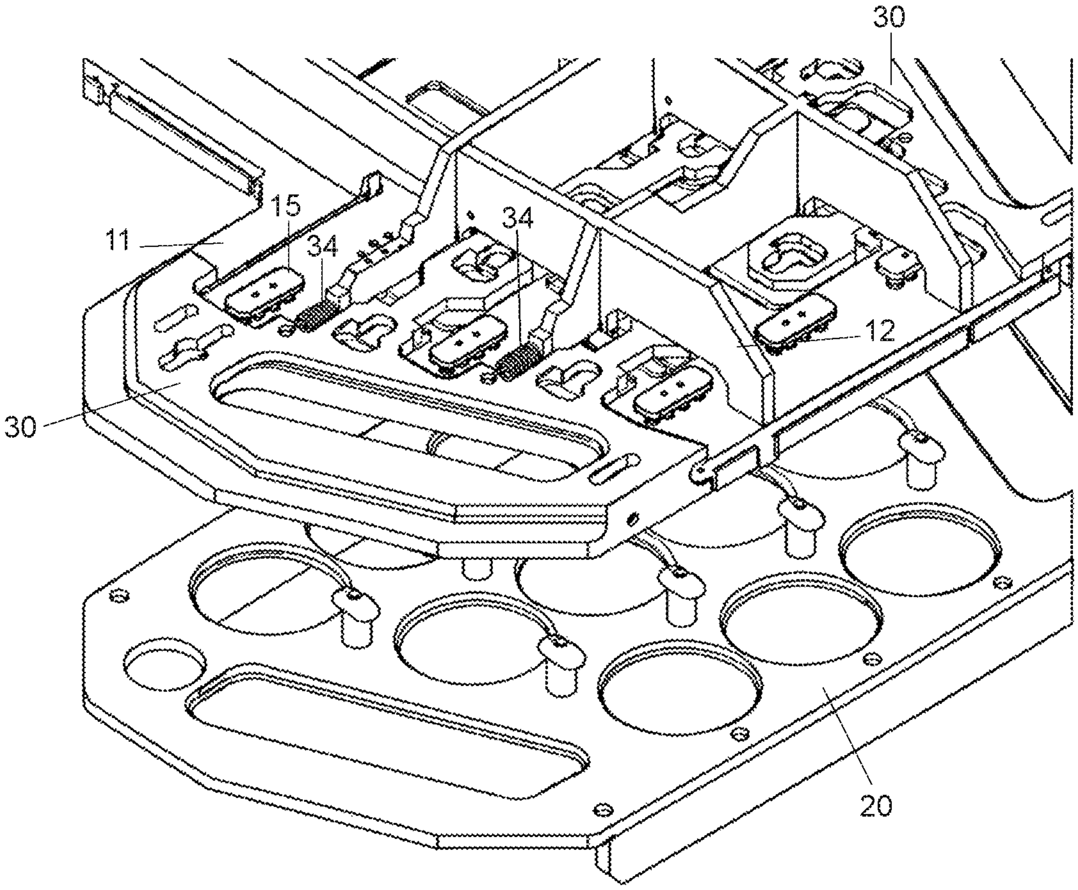
FIG. 5—Top perspective view of a preferred embodiment wherein the fitting structures shown in FIG. 4 are mounted on the chassis, and the tray shown in FIG. 2 is aligned with the chassis.

FIG. 5 illustrates the fitting structure 30 mounted on the chassis 11 in a preferred embodiment of the invention. In this embodiment, two fitting structures 30 are used to couple a tray 20. The fitting structure 30 is held on the chassis 11 of the launcher 10 by a set of bearings 12 that allow the sideways movement of the fitting structure 30 in a linear manner.

Furthermore, springs 34 are used between the fitting structure 30 and the chassis 11, in order to keep the launcher 10 unbolted, meaning, with the fitting structure 30 in the position that allows the insertion or removal of the latch pins 22 on the tray 20. In other words, when the spring 34 is in a resting state, the tray 20 may be coupled or uncoupled.

Furthermore, the munition launcher 10 optionally comprises firing pins 15, which are electro-mechanical contacts that send an electrical signal to the munitions. These contacts are located on the lower part of the chassis.

Figure 6:
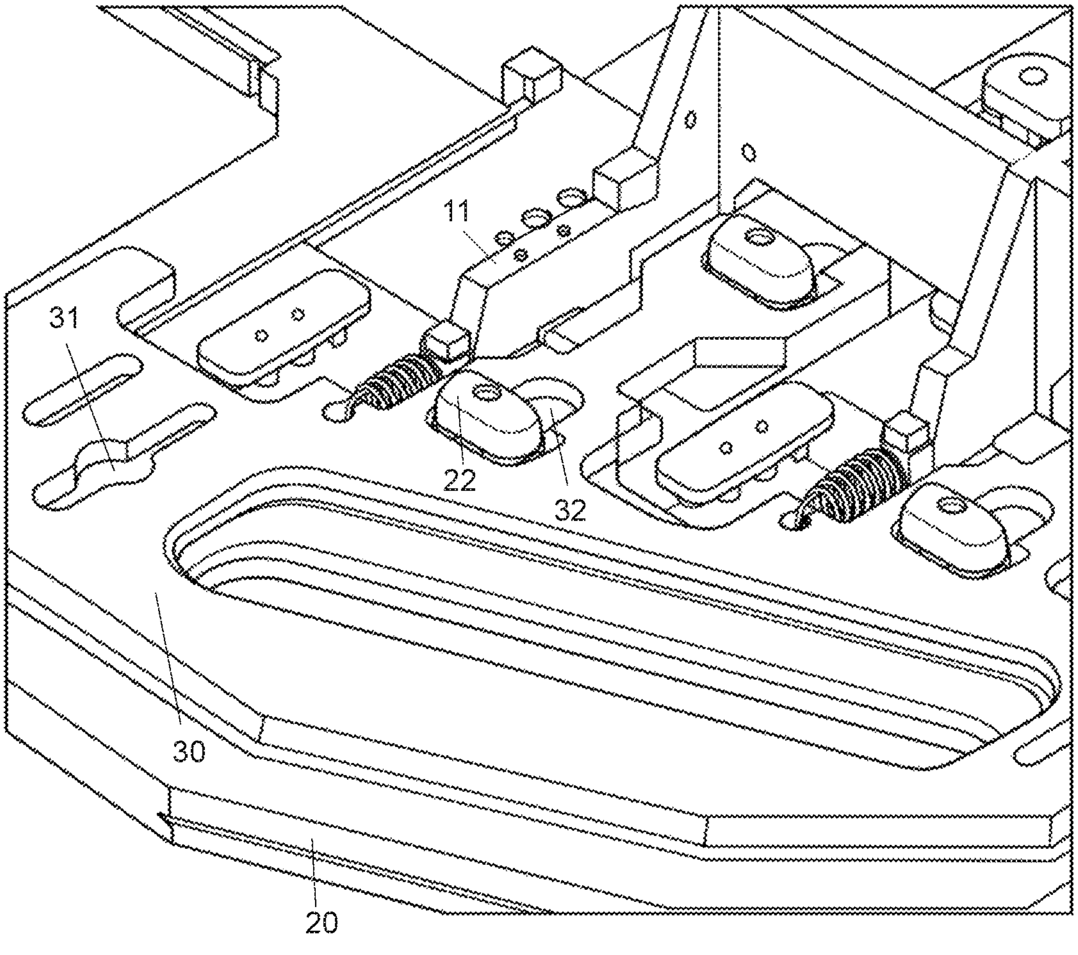
FIG. 6—Close-up view of the unbolted position of the tray with the fitting structures.

FIG. 6 shows the moment that the tray 20 is fitted into the fitting structure 30 in the unbolted position. With the fitting structure 30 in the unbolted position, the tray 20 may be easily inserted into and removed from the launcher 10. When the tray 20 is coupled to the launcher 10, the latch pins 22 run through the openings in the chassis 11 and the fitting openings 32 arranged in the fitting structure 30, as the measurements of the openings in these two parts are compatible with the measurements of the top of the latch pin 22 on the tray 20, in the unbolted position.

FIG. 6 shows that, in this unbolted state, the central opening in the bolt groove 31 is out of alignment with the bolt receiver on the chassis. Consequently, the bolt 41 is not bolted onto the tray 20 on the chassis 11.

Figure 7:
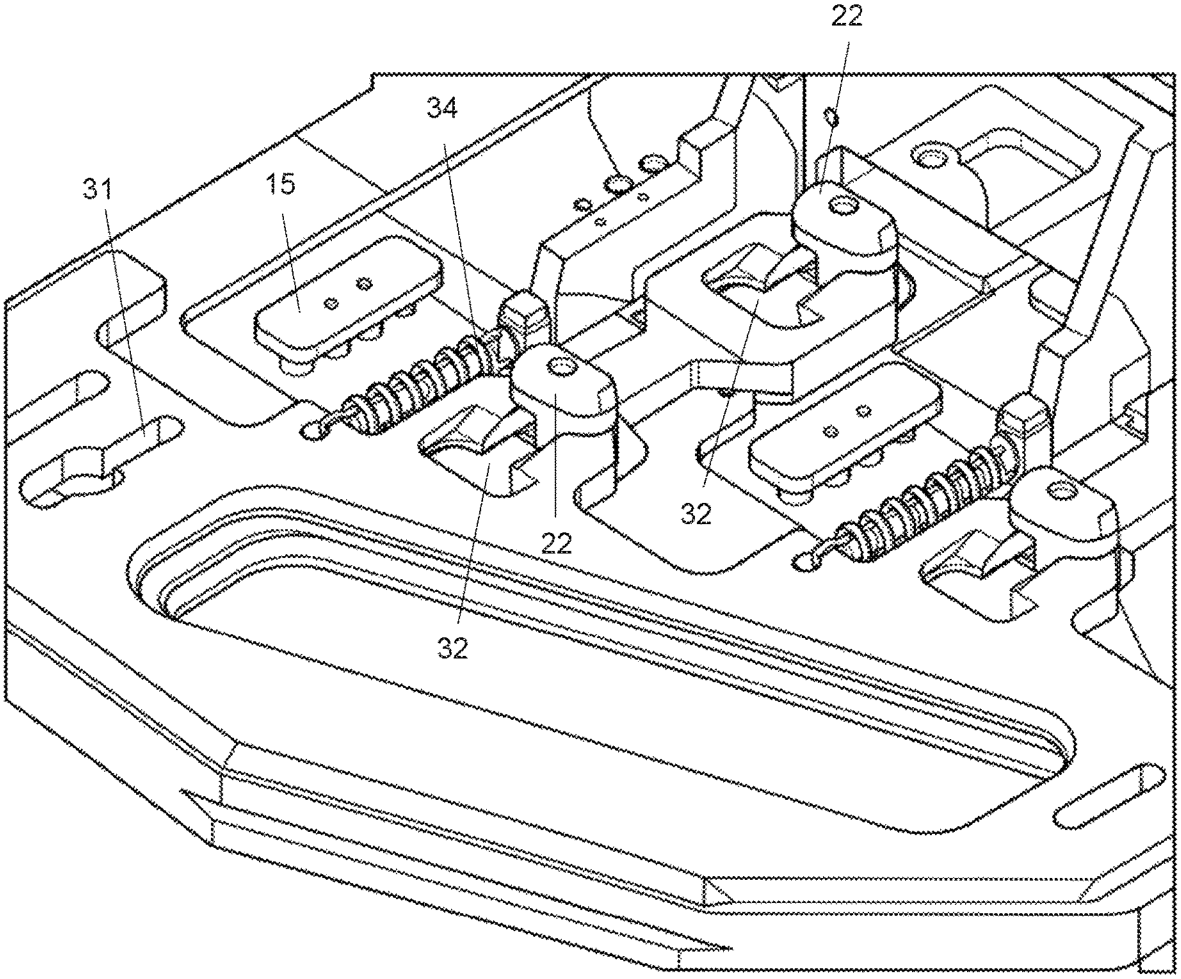
FIG. 7—Close-up view of the bolted position of the tray with the fitting structures.

FIG. 7 shows the bolted state of the tray 20 on the chassis 11. In order to attain the bolted state, the fitting structure 30 must be slid sideways, extending the springs 34 and resulting in the fitting openings 32 also sliding along to a point wherein their diameter is less than that of the top of the latch pin 22. Sliding the fitting structure 30 sideways may take place by pulling laterally on the handles 34 of the fitting structure 30, whereby the dimensions of the fitting openings 32 in contact with the latch pins 22 become smaller, creating an obstacle. In other words, dimensions that were formerly compatible with the top of the latch pin 22, now prevent it passing through the fitting structure 30, thus avoiding the tray 20 uncoupling vertically from the launcher 10.

In order to keep the fitting structure 30 in the bolted position, the bolt 41 automatically locks the tray 20 when the fitting structure 30 reaches the sideways movement needed to align the central opening of the bolt groove 31 with the bolt receiver of the chassis. In the bolted state, the bolt 41 prevents the springs 34 from pulling the fitting structure 30 into the resting position.

Releasing the bolt 41 results in the springs 34 returning immediately to the resting position, pulling the fitting structure 30 into alignment with the fitting openings 32 at the section compatible with the top of the latch pin 22, thus releasing the tray 20.

Figure 8:
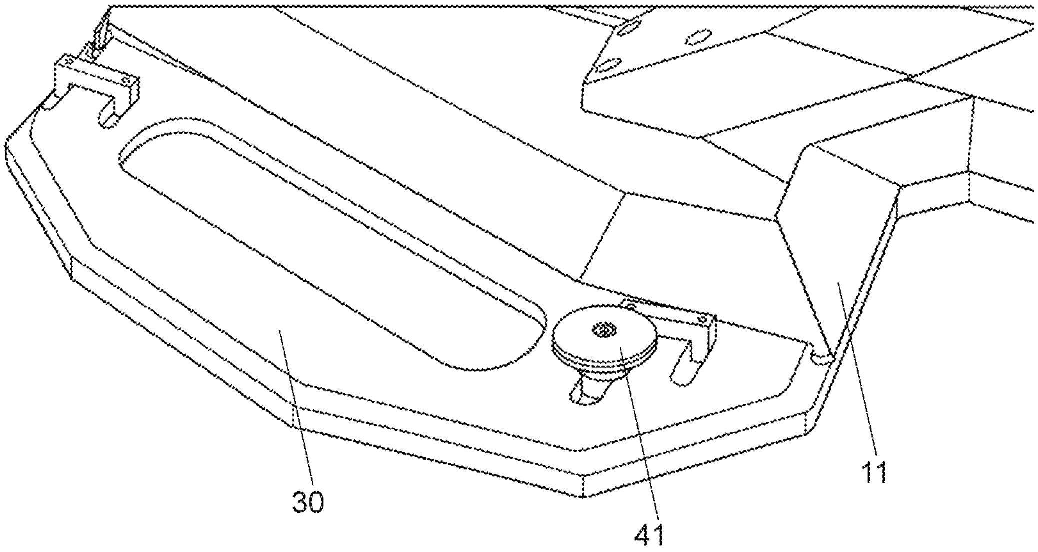
FIG. 8—Close-up view of the bolt arranged on the fitting structure.

The bolt 41 is shown as a retaining device in FIG. 8, according to a preferred embodiment of the invention. However, a key or any other mechanism securing the fitting structure in the desired lateral position may also be used.

As explained above in a preferred embodiment, a munition launcher 10 may comprise two ammunition trays 20, each supported by two fitting structure 30 and held in place by two bolts 41, thus ensuring safety and redundancy for the launcher 10.

According to a preferred embodiment of the invention, the tray 20 is the only part of the launcher 10 that must be handled during the loading operation, needing only to position the munitions. Particularly for removing the ammunition tray 20 from the launcher 10 the user must: a) grip both handles 23 of the ammunition trays 20; b) actuate the bolts 41 with their thumbs, for example; and c) remove the tray 20 from the launcher 10. To insert the ammunition tray 20, the user must: a) grip the handles 23 on the tray 20 and align the tray 20 with the launcher 10; b) lift the tray 20 until the handles 23 onto the tray 20 come into contact with the handles 33 of the fitting structure 30; and c) pull both bolts 41 until they click into place.

This simplified process allows the user to have only spare trays 20 in order to complete the process of positioning new munitions on the tray 20 with the aircraft still in flight. Thus, when the aircraft comes in for loading, the trays 20 with spent munitions will be removed for reloading with new munitions, and the spare trays 20 will be positioned immediately on the launcher.

Optionally, the munition launcher 10 according to this invention may additionally comprise a magnetic sensor (not illustrated) and magnets positioned close to the fitting structure 30, that identify their position (bolted or unbolted). In this embodiment, each fitting structure 30 has a magnet that activates the sensor when it is moved sideways. As an alternative to the magnetic sensor, any other type of sensor or mechanism that can identify the movement of a part may also be used. Non-exhaustive examples of alternatives to the magnetic sensor are an optical sensor, an end switch, and a capacitive sensor.

In the embodiment fitted with sensors, the smart electronics can identify whenever the bolts 41 are not secured correctly, notifying the user in real time of the bolt status.

Figure 9:
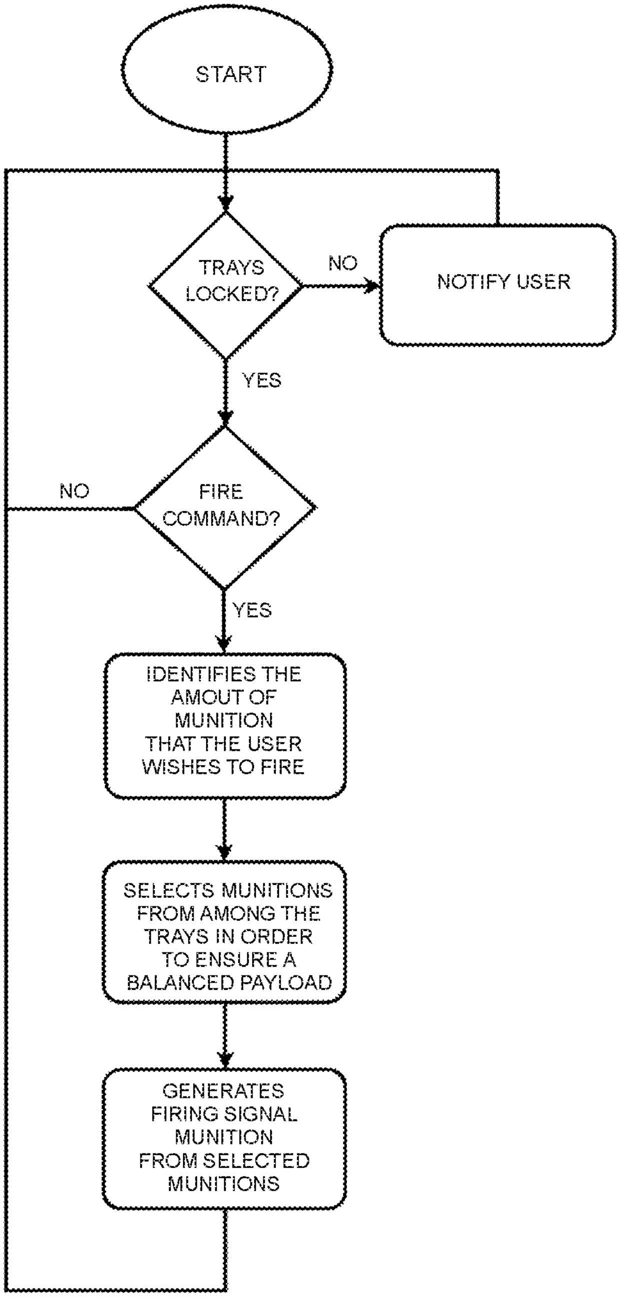
FIG. 9—Flowchart of the main launcher firing and operating control states.

FIG. 9 presents a flowchart with the main firing and operating control status of the launcher 10 performed by software embedded in the smart electronics of the preferred embodiment of the present invention.

Software constantly monitors the status of the bolts 41 on the ammunition trays 20, and notifies the user should it find any tray 20 loose. The purpose of this feature is to prevent the launcher 10 being used if any tray is not fully bolted onto its supporting launcher 10 and coming loose during its operations. If the trays 20 are coupled and bolted correctly, the software monitors the receipt of firing commands. If a command is received, it analyzes the amount of munitions that the user wishes to fire, selects the positions of the munitions to be fired (with priority for balancing the payload), and generates the firing signal for each of them.

The described coupling between the chassis 11 and the tray 20 is exemplified through the latch pins 22 on the tray 20 and fitting openings 32 on the fitting structure 30. However, the same removable coupling principle used for the tray 20 on the chassis 11 may be attained through several different configurations that perform the same function. For example, any part that prevents removal of the tray when slid sideways may be used instead of the illustrated latch pins 22, provided that the corresponding coupling with the fitting structure 30 takes place. Furthermore, the coupling mechanism is not limited to the illustrated fitting structure 30, which may be replaced by alternative configurations, such as levers, cables, knobs or any other type of part that allows a sideways movement through which a variation in the opening diameter comes into contact with the latch pins 22 on the tray 20.

What is claimed is:

1. A munition launcher for aircraft, comprising:

a chassis that is attachable to an aircraft and incorporating electronic intelligence, comprising:

a coupling mechanism attached to the chassis, and at least one ammunition tray coupled in a removable manner to the coupling mechanism, wherein the at least one ammunition tray is provided with latch pins and a bolt receiver, wherein the coupling mechanism includes fitting structures comprising openings whose shape is compatible with the latch pins of the ammunition tray and a bolt groove, and wherein the fitting structures are attached to the chassis in a movable manner by springs.

2. The munition launcher according to claim 1, wherein the at least one ammunition tray comprises:

a plurality of munition openings configured to receive munitions, whereby the ammunition tray is detachable from the chassis via release of the latch pins such that the ammunition tray is coupled in a removable manner to the coupling mechanism of the chassis.

3. The munition launcher according to claim 1, wherein the latch pins have a configuration with a top that has a width that is greater than a width of a body of the latch pins.

4. The munition launcher according to claim 1, wherein the at least one ammunition tray further comprises handles.

5. The munition launcher according to claim 1, wherein the fitting structures are additionally attached to the chassis in a movable manner by bearings.

6. The munition launcher according to claim 1, wherein, in an unbolted position, the ammunition tray is connectable to the fitting structures via insertion of the latch pins on the ammunition tray into the openings of the fitting structures.

7. The munition launcher according to claim 6, further comprising, for each fitting structure of the fitting structures, a bolt configured to run through the bolt groove and hold the respective fitting structure in a bolted position.

8. The munition launcher according to claim 7, wherein actuation of the bolt returns the respective fitting structure to the unbolted position.

* * * * *